(12) United States Patent
Genda

(10) Patent No.: US 8,375,183 B1
(45) Date of Patent: Feb. 12, 2013

(54) METHOD AND APPARATUS FOR ARCHIVING DE-DUPLICATED DATA MAINTAINED BY AN INTELLIGENT BACKUP APPLIANCE

(75) Inventor: Jon Genda, Rogers, MN (US)

(73) Assignee: Symantec Corporation, Mountain View, CA (US)

( * ) Notice: Subject to any disclaimer, the term of this patent is extended or adjusted under 35 U.S.C. 154(b) by 395 days.

(21) Appl. No.: 12/415,464

(22) Filed: Mar. 31, 2009

(51) Int. Cl.
*G06F 12/16* (2006.01)
*G06F 12/00* (2006.01)

(52) U.S. Cl. .............. 711/162; 711/E12.103; 707/668

(58) Field of Classification Search .............. 711/162
See application file for complete search history.

(56) References Cited

U.S. PATENT DOCUMENTS

| 2010/0036887 | A1* | 2/2010 | Anglin et al. | 707/200 |
| 2010/0042790 | A1* | 2/2010 | Mondal et al. | 711/161 |
| 2010/0174881 | A1* | 7/2010 | Anglin et al. | 711/162 |

\* cited by examiner

*Primary Examiner* — Charles Rones
*Assistant Examiner* — Eric Loonan
(74) *Attorney, Agent, or Firm* — Campbell Stephenson LLP

(57) ABSTRACT

Method and apparatus for archiving de-duplicated data maintained by an intelligent backup appliance are described. In some examples, backup data managed by a backup appliance in a computer system is archived. A request to archive selected backup images of a plurality of backup images maintained by the backup appliance is received. The selected backup images are compared with a pool of de-duplicated data for the plurality of backup images maintained by the backup appliance to identify common data among the selected backup images and unique data in each of the selected backup images. A core backup is stored on first archive storage media, the core backup including at least a portion of the common data. A unique backup is stored on second archive storage media, the unique backup including the unique data a reference to the core backup stored on the first archive storage media.

23 Claims, 4 Drawing Sheets

METHOD AND APPARATUS FOR ARCHIVING DE-DUPLICATED DATA MAINTAINED BY AN INTELLIGENT BACKUP APPLIANCE

BACKGROUND OF THE INVENTION

1. Field of the Invention

The present invention relates generally to computer systems. More particularly, the present invention relates to a method and apparatus for archiving de-duplicated data maintained by an intelligent backup appliance.

2. Description of the Related Art

Computer systems typically include many client computers coupled to a network. For data protection, such computer systems can include one or more backup appliances for backing up data stored on the client computers. A modern backup appliance can store much of the backup data in a de-duplicated state. With de-duplication, common data is stored only once. Backup images include unique data and references to the common de-duplicated data.

In some cases, the backup data maintained by a backup appliance is archived to archival storage (e.g., for off-site storage). Exemplary archive storage includes tape storage. Presently, to make an archive of the backup data, a backup appliance reassembles each backup image by using the references therein to combine the unique data and the common data. A complete copy of each backup image is then stored on archive storage media. Since an entire copy of each backup image is archived, a large amount of common data is duplicated across the archive storage media. As the number of backup images to be archived increases, the amount of duplicate data that is being stored also increases. This redundant copying of common data results in a large amount of wasted space on the archive storage media, requires more archive storage media than necessary, and requires more time to perform the archive process than necessary.

SUMMARY OF THE INVENTION

Aspects of the invention relate to a method, apparatus, and computer readable medium for archiving backup data managed by a backup appliance in a computer system. In some embodiments, a request to archive selected backup images of a plurality of backup images maintained by the backup appliance is received. The selected backup images are compared with a pool of de-duplicated data for the plurality of backup images maintained by the backup appliance to identify common data among the selected backup images and unique data in each of the selected backup images. A core backup is stored on first archive storage media, the core backup including at least a portion of the common data. A unique backup is stored on second archive storage media, the unique backup including the unique data a reference to the core backup stored on the first archive storage media.

In some embodiments, a redundant portion of the common data is determined to have been previously stored on third archive storage media, wherein the core backup includes only the common data other than the redundant portion; and wherein the unique backup includes a reference to the redundant portion stored on the third archive storage media.

In some embodiments, new de-duplicated data is identified in the pool of de-duplicated data that is common among the selected backup images. An incremental backup to the core backup is stored on the first archive storage media or third archive storage media, the incremental backup including the new de-duplicated data.

In some embodiments, the selected backup images is compared with the pool of de-duplicated data to identify new unique data in each of the selected backup images. An incremental backup to the unique backup is stored on the second archive storage media or third archive storage media, the incremental backup including the new unique data.

In some embodiments, new de-duplicated data is identified in the pool of de-duplicated data that is common among the selected backup images. The selected backup image is compared with the pool of de-duplicated data to identify new unique data in each of the selected backup images. An incremental core backup to the core backup is stored on the first archive storage media or third archive storage media, the incremental core backup including the new de-duplicated data. An incremental unique backup to the unique backup is stored on the second archive storage media or fourth archive storage media, the incremental unique backup including the new unique data.

In some embodiments, the first archive storage media and the second archive storage media each include one or more tapes. In some embodiments, the request is received in response to an archive schedule.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
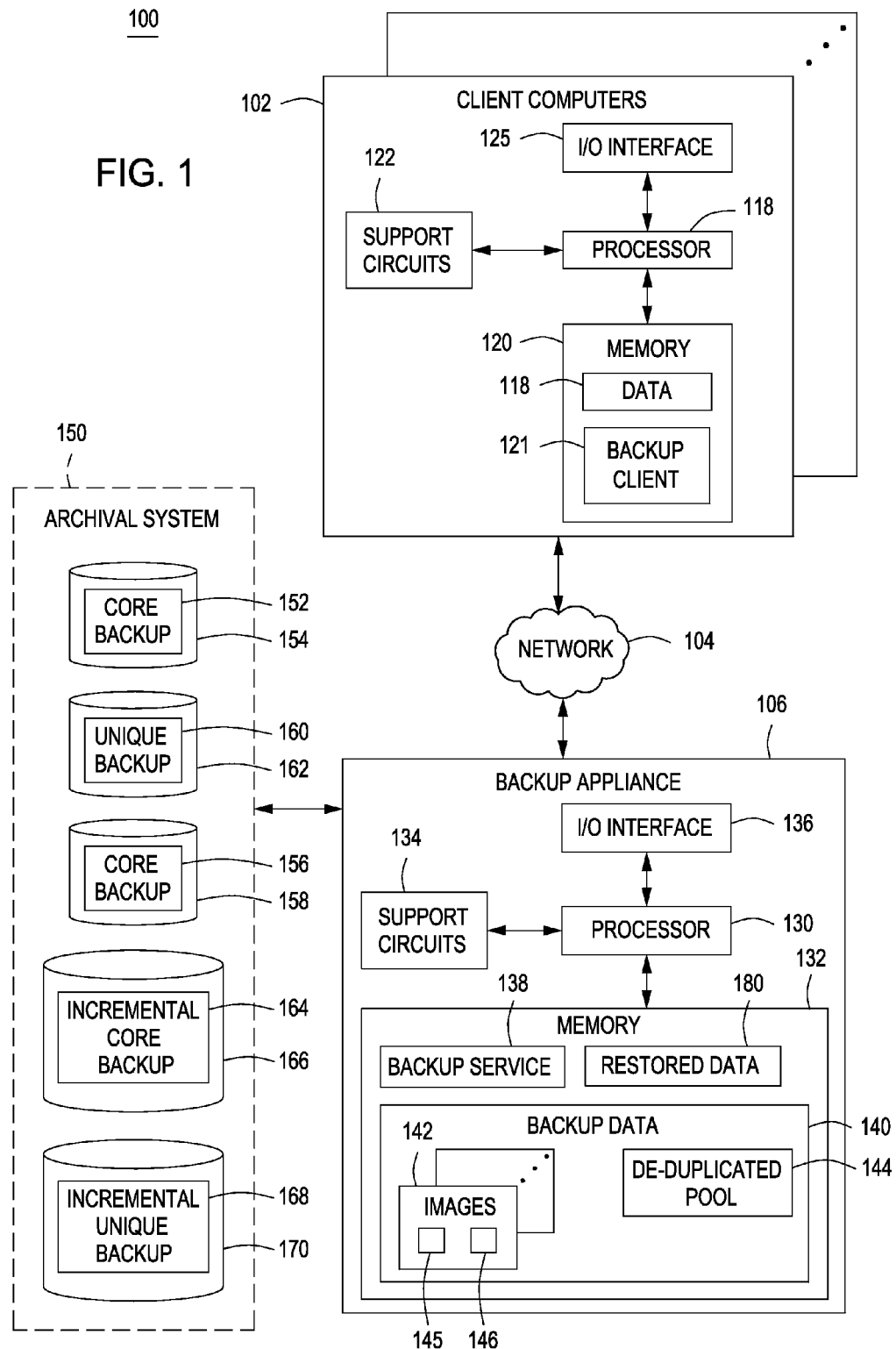
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes client computers 102, a network 104, a backup appliance 106, and an archival storage system 150. The network 104 comprises a communication system that connects computer systems by wire, cable, fiber optic, and/or wireless links facilitated by various types of well-known network elements, such as hubs, switches, routers, and the like. In particular, the network 104 may connect the client computers 102 and the backup appliance 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN). Alternatively, the network 104 may comprise a storage area network (SAN) implemented using fibre channel (FC) or the like.

Each of the client computers 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces and/or devices, human interface devices (HIDs), displays, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

Each of the client computers 102 is configured to store data 118. The data 118 can include various files stored in the memory 120. Each of the client computers 102 is further configured with a backup client 121. The backup client 121 may include software configured for execution by the processor 118 and configured to interact with the backup appliance 106 to perform a backup of the data 118. The backup client 121 in each of the client computers 102 may perform multiple backups of the data 118 over time in accordance with a schedule. Some portion of the data 118 may be common across one or more of the client computers 102, and some portion of the data 118 may be unique across one or more of the client computers 102. Further, for a given client computer 102, multiple backups of the data 118 may include some common data and some unique data among the multiple backups.

The backup appliance 106 illustratively includes a processor 130, a memory 132, various support circuits 134, an I/O interface 136. The processor 130 may include one or more microprocessors known in the art. The support circuits 134 for the processor 130 include conventional cache, power supplies, clock circuits, data registers, I/O interfaces and/or devices, human interface devices (HIDs), displays, and the like. The I/O interface 136 may be configured for communication with the network 104. The memory 132 may include one or more of the following random access memory, read only memory, magneto-resistive read/write memory, optical read/write memory, cache memory, magnetic read/write memory, and the like.

The backup appliance 106 is configured with a backup service 138. The backup service 138 may include software configured for execution by the processor 130 and configured to communicate with the backup client 121 in each of the client computer 102 to backup the data 118 therein. Thus, the backup service 138 manages backup data 140. The backup data 140 includes a plurality of backup images 142. A "backup image" represents a particular copy of the data 118 in a particular one of the client computers 102. The backup data 140 may include several backup images for each of the client computers 102. The backup service 138 is further configured to implement data de-duplication for the backup data 140. Through data de-duplication, the backup data 140 includes pool of de-duplicated data ("de-duplicated data pool 144") for the plurality of backup images 142. The de-duplicated data pool 144 includes data that is common among sets of the backup images 142. Each of the backup images 142 includes data unique among the backup images 142 ("unique data 145"), as well as references 146 to data in the de-duplicated data pool 144. Such de-duplication reduces the amount of storage needed to store the backup data 140, since redundant data among the backup images 142 is only stored once.

The backup appliance 106 is coupled to the archival storage system 150 (e.g., through the I/O interface 136). The archival storage system 150 may include one or more archive storage devices configured to store data on archive storage media. Exemplary archive storage devices include tape drives, and exemplary archive storage media includes tape media. The backup service 138 is configured to archive at least a portion of the backup data 140 using the archival storage system 150. Notably, the backup service 138 is configured to leverage the de-duplication in the backup data 140 to include a core set of archive storage media for storing common data, and a unique set archive storage media for storing unique data that was not eligible for de-duplication.

Figure 6:
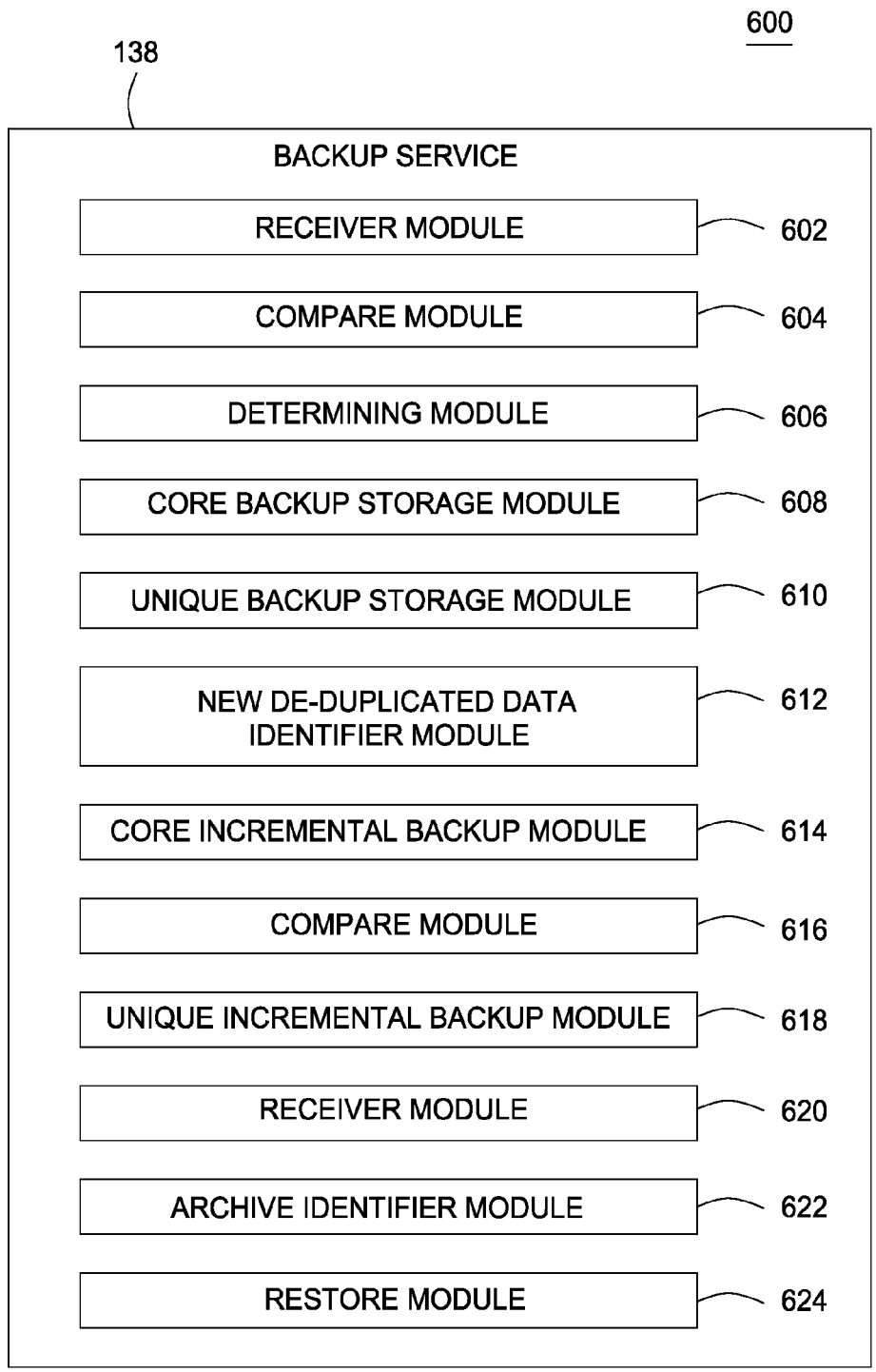
FIG. 6 is a block diagram depicting the backup service according to some embodiments of the invention

FIG. 6 is a block diagram depicting the backup service 138 according to some embodiments of the invention. The backup service 138 includes a receiver module 602, a compare module 604, a determining module 606, a core backup storage module 608, and a unique backup storage module 610. The functions of the modules 602-610 are described below with respect to FIG. 2. The backup service 138 may further include a new de-duplicated data identifier module 612 and a core incremental backup module 614. The functions of the modules 612 and 614 are described below with respect to FIG. 3. The backup service 138 may further include a compare module 616 and a unique incremental backup module 618. The functions of the modules 616 and 618 are described below with respect to FIG. 4. The backup service 138 may further include a receiver module 620, an archive identifier module 622, and a restore module 624. The functions of the modules 620-624 are described below with respect to FIG. 5. Although the backup service 138 is shown as including distinct modules each performing a specific function, it is to be understood that the backup service 138 may generally include one or more modules each performing one or more of the functions described herein. The modules 602-624 may include program code executable by the processor 130 in the backup appliance 106.

Figure 2:
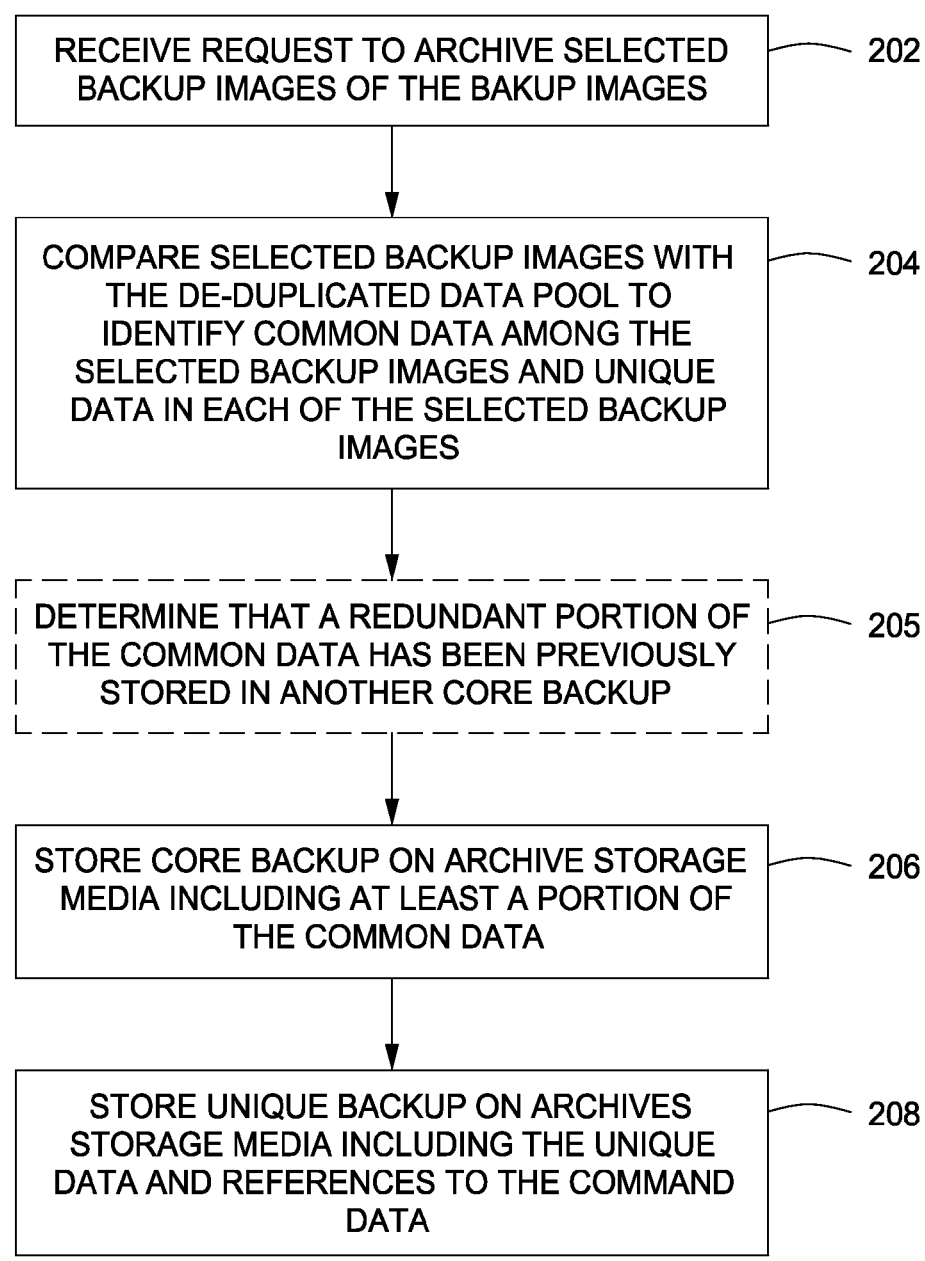
FIG. 2 is a flow diagram depicting a method of archiving backup data managed by a backup appliance in a computer system according to some embodiments of the invention.

FIG. 2 is a flow diagram depicting a method 200 of archiving backup data managed by a backup appliance in a computer system according to some embodiments of the invention. The method 200 can be implemented by the backup service 138 executed in the backup appliance 106, shown above in FIG. 1. For purposes of clarity, aspects of the method 200 are described with respect to the computer system 100 shown in FIG. 1. Further, aspects of the method 200 may be understood with reference to the modules shown in FIG. 6.

The method 200 begins at step 202, where the backup service 138 receives a request to archive selected backup images of the backup images 142 maintained by the backup appliance 106. In some embodiments, the function of receiving the request is performed by the receiver module 602. For example, an administrator may interact with the backup service 138 to select particular ones of the backup images 142 to be archived. In another example, the backup service 138 may be configured to archive specific ones of the backup images 142 based on a schedule. The selected backup images can include all or a portion of the backup images 142. At step 202, the input is the request, and the output is identification of selected backup images to be archived. The output of step 202 may be stored in the memory 132.

At step 204, the backup service 138 compares the selected backup images with the de-duplicated data pool 144 to identify common data among the selected backup images and unique data in each of the selected backup images. In some embodiments, the function of comparing the selected backup images with the de-duplicated data pool 144 is performed by the compare module 604. As noted above, each of the backup images 142 includes unique data 145, as well as references 146 to common data in the de-duplicated data pool 144. Thus, given the selected backup images, the backup service 138 can identify common data from the de-duplicated data pool 144, and the unique data 145 in each of the selected backup images. In step 204, the input is the selected backup images and the de-duplicated data pool 144, and the output is the identity of common data among the selected backup images and unique data in each of the selected backup images. The output of step 204 may be stored in the memory 132.

At step 206, the backup service 138 stores a core backup 152 on archive storage media 154 (e.g., one or more tapes). In some embodiments, the function of storing the core backup 152 is performed by the core backup storage module 608. The core backup 152 includes at least a portion of the common data identified in step 204. In some embodiments, the core backup 152 includes all of the common data identified in step 204. In some embodiments, the core backup 152 includes less than all of the common data. In step 206, the input is the common data identified in step 204, and the output is the core backup 152. The output of step 206 may be stored in the archive storage media 154.

For example, the method 200 may include an optional step 205 between steps 204 and 206. At step 205, the backup service 138 determines that a redundant portion of the common data identified in step 204 has been previously stored in a core backup 156 on archive storage media 158. In some embodiments, the function of determining is performed by the determining module 606. In step 205, the input is the common data identified in step 204 and the core backup 156, and the output is an identification of the redundant portion of the command data. The output of step 205 may be stored in the memory 132.

Then, at step 206, the backup service 138 can store only the common data other than the redundant data in the core backup 152. In essence, the backup service 138 can determine if previous core backups exist that already include elements of the identified common data. If such previous core backups exist, the backup service 138 does not redundantly store the common data in more than two core backups. Note that the redundant portion of the common data may be stored in more than one core backup 156 on archive storage media (e.g., multiple core backups).

At step 208, the backup service 138 stores a unique backup 160 on archive storage media 162 (e.g., one or more tapes). In some embodiments, the function of storing the unique backup 160 can be performed by the unique storage module 610. The unique backup 160 includes the unique data identified in step 204. The unique backup 160 also includes a reference to the core backup 152. Further, if the backup service 138 omits storing a redundant portion of the common data in the core backup 152, the unique backup 160 can include a reference to other core backup(s) having the redundant portion (e.g., the core backup 156). At step 208, the input is the unique data identified in step 204, and the output is the unique backup. The output of step 208 may be stored in the archive storage media 162.

In this manner, two backup sets are created for the selected backup images: (1) a core backup set; and (2) a unique backup set. The core backup set stores data common among the selected backup images, and the unique backup set stores data unique to each of the selected backup images. The two backup sets maintain the relationship between the de-duplicated data in the core backup sets and the unique data in the unique backup sets.

Figures 3, 4, 5:
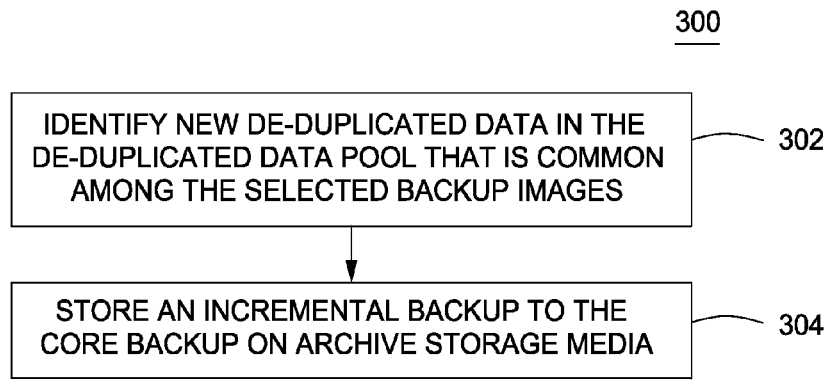
FIG. 3 is a flow diagram depicting a method of incrementally archiving backup data managed by a backup appliance in a computer system according to some embodiments of the invention.
FIG. 4 is a flow diagram depicting a method of incrementally archiving backup data managed by a backup appliance in a computer system according to some embodiments of the invention.
FIG. 5 is a flow diagram depicting a method for restoring archived backup data according to some embodiments of the invention.

FIG. 3 is a flow diagram depicting a method 300 of incrementally archiving backup data managed by a backup appliance in a computer system according to some embodiments of the invention. The method 300 can be implemented by the backup service 138 executed in the backup appliance 106, shown above in FIG. 1. For purposes of clarity, aspects of the method 300 are described with respect to the computer system 100 shown in FIG. 1. Further, the method 300 assumes that the backup service 138 has performed the method 200 to archive selected backup images, as described above. Further, aspects of the method 200 may be understood with reference to the modules shown in FIG. 6.

The method 300 begins at step 302, where the backup service 138 identifies new de-duplicated data in the de-duplicated data pool 144 that is common among the selected backup images. By "new", it is meant that the data was not in the de-duplicated data pool 144 when the backup data was last archived (e.g., after the method 200). For example, the backup service 138 may have performed additional backups of the data 118 in the client computers 102. In some embodiments, the function of step 302 is performed by the identifier module 612. At step 302, the input is the de-duplicated data pool 144 and the selected backup images, and the output is the new de-duplicated data. The output of step 302 may be stored in the memory 132.

At step 304, the backup service 138 stores an incremental backup 164 to the core backup 152 on archive storage media. The incremental backup 164 can be stored on the archive storage media 154 that stores the core backup 152, or different archive storage media 166. The incremental backup 164 includes the new data in the de-duplicated data pool 144 that was identified in step 302. In this manner, the backup service 138 can avoid making a new full core backup by making an incremental core backup. In some embodiments, the function of step 304 is performed by the core incremental backup module 614. At step 304, the input is the new de-duplicated data, and the output is the incremental backup 164. The output of step 202 may be stored in archive storage media 154 or the archive storage media 166.

FIG. 4 is a flow diagram depicting a method 400 of incrementally archiving backup data managed by a backup appliance in a computer system according to some embodiments of the invention. The method 400 can be implemented by the backup service 138 executed in the backup appliance 106, shown above in FIG. 1. For purposes of clarity, aspects of the method 400 are described with respect to the computer system 100 shown in FIG. 1. Further, the method 400 assumes that the backup service 138 has performed the method 200 to archive selected backup images, as described above. Further, aspects of the method 200 may be understood with reference to the modules shown in FIG. 6.

The method 400 begins at step 402, where the backup service 138 compares the selected backup images with the de-duplicated data pool 144 to identify new unique data in each of the selected backup images. By "new", it is meant that the data was not in the selected backup images when the backup data was last archived (e.g., after the method 200). For example, the backup service 138 may have performed additional backups of the data 118 in the client computers 102. In some embodiments, the function of step 402 is performed by the compare module 616. At step 402, the input is the selected backup images and the de-duplicated data pool 144, and the output is the new unique data in each of the selected backup images. The output of step 402 may be stored in the memory 132.

At step 404, the backup service 138 stores an incremental backup 168 to the unique backup 160 on archive storage media. The incremental backup 168 can be stored on the archive storage media 162 that stores the unique backup 160, or different archive storage media 170. The incremental backup 168 includes the new unique data that was identified in step 402. In this manner, the backup service 138 can avoid making a new full unique backup by making an incremental unique backup. In some embodiments, the function of step 404 is performed by the unique incremental backup module 618. At step 404, the input is the new unique data from step 402, and the output is the incremental backup 168. The output of step 402 may be stored in the archive storage media 162 or the archive storage media 170.

It is to be understood that both of methods 300 and 400 may be performed concurrently to produce incremental core backup(s) and incremental unique backup(s) over time.

FIG. 5 is a flow diagram depicting a method 500 for restoring archived backup data according to some embodiments of the invention. The method 500 can be performed by the backup service 138 executed on the backup appliance 106 shown in FIG. 1. The method 500 assumes that the backup data 140 has been archived to produce a core backup (e.g., the core backup 152) and a unique backup (e.g., the unique backup 160). Incremental core backups and/or unique backups may also have been performed (e.g., the incremental backup 164 and/or the incremental backup 168). Further, aspects of the method 200 may be understood with reference to the modules shown in FIG. 6.

The method 500 begins at step 502, where the backup service 138 receives a request to restore selected backup images from archive storage media. In some embodiments, the function of step 502 may be performed by the receiver module 620. At step 502, the input is the request, and the output is identification of selected backup images to be restored. The output of step 502 may be stored in the memory 132.

At step 504, the backup service 138 identifies archive storage media having the core backup, any incremental core backups, the unique backup, and any incremental unique backups. In some embodiments, the function of step 504 may be performed by the archive identifier module 622. At step 504, the input is the selected backup images to be restored, and the output is identified archive storage media needed to restore the selected backup images. The output of step 504 may be stored in the memory 132.

At step 506, the backup service 138 restores the selected backup images as restored data 180 in the backup appliance 106. The backup service 138 can combine the unique backup 160 with any incremental unique backups (e.g., the incremental backup 168) to obtain the unique data in each of the selected backup images. The backup service 138 can combine the core backup 152 with any incremental core backups (e.g., the incremental backup 164) to obtain the common data among the selected backup images. The backup service 138 can synthesize a complete backup image using the references in the unique data to the common data. In some embodiments, the function of step 506 may be performed by the restore module 624. At step 506, the input is the identified archive storage media identified in step 504, and the output is the restored selected backup images in the restore data 180. The output of step 506 may be stored in the memory 132.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
receiving a request to archive one or more backup images, wherein
the one or more backup images are selected from a plurality of backup images, and
the plurality of backup images are maintained by a backup appliance;
retrieving the one or more backup images from the backup appliance, wherein
the backup appliance is configured to perform de-duplication of data of the plurality of backup images,
the backup appliance maintains common data of the plurality of backup images as a pool of de-duplicated data,
the retrieving comprises
identifying unique data and common data of the one or more backup images by comparing data of the one or more backup images with the pool of de-duplicated data, and
retrieving the unique data and the common data of the one or more backup images; and
archiving the data of the one or more backup images, wherein
the archiving comprises
identifying new common data of the one or more backup images, wherein
the new common data comprises at least a subset of the common data of the one or more backup images that has not been previously stored in an archival system, and
the identifying comprises comparing the common data of the one or more backup images with common data previously stored in the archival system,
storing the new common data in the archival system, and
storing the unique data in the archival system.

2. The method of claim 1, wherein the archiving further comprises:
storing the new common data on a first archive storage media of the archival system, and
storing the unique data on a second archive storage media of the archival system.

3. The method of claim 2, further comprising:
determining that a portion of the common data of the one or more backup images has been previously stored on third archive storage media.

4. The method of claim 2, further comprising:
identifying an additional set of common data of the one or more backup images that has not been previously stored in the archival system; and
storing the additional set of common data on the first archive storage media or third archive storage media.

5. The method of claim 2, further comprising:
identifying an additional set of unique data of the one or more backup images; and
storing the additional set of unique data on the second archive storage media or third archive storage media.

6. The method of claim 2, further comprising:
identifying an additional set of common data of the one or more backup images that has not been previously stored on the archival system;
identifying an additional set of unique data of the one or more backup images;
storing the additional set of common data on the first archive storage media or third archive storage media; and
storing the additional set of unique data on the second archive storage media or fourth archive storage media.

7. The method of claim 2, wherein the first archive storage media and the second archive storage media each include one or more tapes.

8. The method of claim 2, wherein the request is received in response to an archive schedule.

9. An apparatus comprising:
means for receiving a request to archive one or more backup images, wherein the one or more backup images are selected from a plurality of backup images, and the plurality of backup images are maintained by a backup appliance;
means for retrieving the one or more backup images from the backup appliance, wherein
the backup appliance is configured to perform de-duplication of data of the plurality of backup images,
the backup appliance maintains common data of the plurality of backup images as a pool of de-duplicated data, and
the means for retrieving comprises
means for identifying unique data and common data of the one or more backup images by comparing data of the one or more backup images with the pool of de-duplicated data, and
means for retrieving the unique data and the common data of the one or more backup images; and
means for archiving the data of the one or more backup images, wherein
the means for archiving comprises
means for identifying new common data of the one or more backup images, wherein
the new common data comprises at least a subset of the common data of the one or more backup images that has not been previously stored in an archival system, and
the identifying comprises comparing the common data of the one or more backup images with common data previously stored in the archival system,
means for storing the new common data in the archival system, and
means for storing the unique data in the archival system.

10. The apparatus of claim 9, wherein the means for archiving further comprises:
means for storing the new common data on a first archive storage media of the archival system, and
means for storing the unique data on a second archive storage media of the archival system.

11. The apparatus of claim 10, further comprising:
means for determining that a portion of the common data of the one or more backup images has been previously stored on third archive storage media.

12. The apparatus of claim 10, further comprising:
means for identifying an additional set of common data of the one or more backup images that has not been previously stored in the archival system; and
means for storing the additional set of common data on the first archive storage media or third archive storage media.

13. The apparatus of claim 10, further comprising:
means for identifying an additional set of unique data of the one or more backup images; and
means for storing the additional set of unique data on the second archive storage media or third archive storage media.

14. The apparatus of claim 10, further comprising:
means for identifying an additional set of common data of the one or more backup images that has not been previously stored on the archival system;
means for identifying an additional set of unique data of the one or more backup images;
means for storing the additional set of common data on the first archive storage media or third archive storage media; and
means for storing the additional set of unique data on the second archive storage media or fourth archive storage media.

15. The apparatus of claim 10, wherein the first archive storage media and the second archive storage media each include one or more tapes.

16. The apparatus of claim 10, wherein the request is received in response to an archive schedule.

17. A computer readable medium having instructions stored thereon that when executed by a processor cause the processor to perform a method comprising:
receiving a request to archive one or more backup images, wherein
the one or more backup images are selected from a plurality of backup images, and
the plurality of backup images are maintained by a backup appliance;
retrieving the one or more backup images from the backup appliance, wherein
the backup appliance is configured to perform de-duplication of data of the plurality of backup images,
the backup appliance maintains common data of the plurality of backup images as a pool of de-duplicated data, and
the retrieving comprises
identifying unique data and common data of the one or more backup images by comparing data of the one or more backup images with the pool of de-duplicated data, and
retrieving the unique data and the common data of the one or more backup images; and
archiving the data of the one or more backup images, wherein
the archiving comprises
identifying new common data of the one or more backup images, wherein the new common data comprises at least a subset of the common data of the one or more backup images that has not been previously stored in an archival system, and the identifying comprises comparing the common data from of the one or more backup images with common data previously stored in the archival system, storing the new common data in the archival system, and storing the unique data in the archival system.

18. The computer readable storage medium of claim 17, wherein the archiving further comprises:

storing the new common data on a first archive storage media of the archival system, and storing the unique data on a second archive storage media of the archival system.

19. The computer readable medium of claim 18, further comprising:

determining that a portion of the common data of the one or more backup images has been previously stored on third archive storage media.

20. The computer readable medium of claim 18, further comprising:

identifying an additional set of common data of the one or more backup images that has not been previously stored in the archival system; and storing the additional set of common data on the first archive storage media or third archive storage media.

21. The computer readable medium of claim 18, further comprising:

identifying an additional set of unique data of the one or more backup images; and storing the additional set of unique data on the second archive storage media or third archive storage media data.

22. The computer readable medium of claim 18, further comprising:

identifying an additional set of common data of the one or more backup images that has not been previously stored on the archival system;

identifying an additional set of unique data of the one or more backup images;

storing the additional set of common data on the first archive storage media or third archive storage media; and storing the additional set of unique data on the second archive storage media or fourth archive storage media.

23. The computer readable medium of claim 18, wherein the first archive storage media and the second archive storage media each include one or more tapes.

* * * * *